US011364394B2

United States Patent
Wenderoth

(10) Patent No.: US 11,364,394 B2
(45) Date of Patent: Jun. 21, 2022

(54) HIGH-PRESSURE CONNECTOR FOR A FLUID-COMMUNICATING CONNECTION OF A BREATHING GAS SOURCE OF A RESPIRATOR TO A PRESSURE REDUCER

(71) Applicant: Dräger Safety AG & Co. KGaA, Lübeck (DE)

(72) Inventor: Kurt Wenderoth, Ratzeburg (DE)

(73) Assignee: Dräger Safety AG & Co. KGaA, Lübeck (DE)

( * ) Notice: Subject to any disclaimer, the term of this patent is extended or adjusted under 35 U.S.C. 154(b) by 714 days.

(21) Appl. No.: 16/275,698

(22) Filed: Feb. 14, 2019

(65) Prior Publication Data
US 2019/0255369 A1    Aug. 22, 2019

(30) Foreign Application Priority Data

Feb. 19, 2018    (DE) .................... 10 2018 001 281.7

(51) Int. Cl.
*A62B 9/04*    (2006.01)
*F16L 19/02*    (2006.01)
(Continued)

(52) U.S. Cl.
CPC .................. *A62B 9/04* (2013.01); *A62B 7/10* (2013.01); *A62B 23/02* (2013.01); *F16L 19/02* (2013.01)

(58) Field of Classification Search
CPC .. A62B 9/04; A62B 9/02; A62B 9/022; A62B 9/025; A62B 9/027; A62B 9/00;
(Continued)

(56) References Cited

U.S. PATENT DOCUMENTS 4,586,634 A * 5/1986 Minter .................... F17C 13/04
                                                                137/322
4,759,530 A * 7/1988 Iff ......................... F16K 1/2265
                                                                251/214
(Continued)

FOREIGN PATENT DOCUMENTS

CN    103721490 A    4/2014
CN    204985990 U    1/2016
(Continued)

OTHER PUBLICATIONS

Zhuang Yuliang: "Research on Basic Theory and Application of Enterprise Resource Planning System Based on Reverse Logistics", Dec. 31, 2007,China University of Mining and Technology Press, p. 95, ISBN 978-7-81107-822-0.

*Primary Examiner* — Joseph D. Boecker
*Assistant Examiner* — Brian T Khong
(74) *Attorney, Agent, or Firm* — McGlew and Tuttle, P.C.

(57) ABSTRACT

A high-pressure connector (10), for a fluid-communicating connection of a breathing gas source (200) of a respirator to a pressure reducer (110), includes a connector upper part (20) with a connector upper part duct (22) with an inlet opening (24) for the inflow of breathing gas from the breathing gas source (200). A connector lower part (30) has a connector lower part duct (32) with an outlet opening (34) for the outflow of breathing gas into the pressure reducer (110). The connector upper part (20) is fastened reversibly with a fastening interface (26) to a counter-fastening interface (36) of the connector lower part (30). The connector upper part duct (22) is in fluid-communicating connection with the connector lower part duct (32). A filter device (40) is arranged in the connector upper part duct (22) in at least some sections for filtering solid particles out of the breathing gas.

17 Claims, 2 Drawing Sheets

(51) Int. Cl.
*A62B 23/02* (2006.01)
*A62B 7/10* (2006.01)

(58) Field of Classification Search
CPC .... A62B 7/00; A62B 7/02; A62B 7/04; A62B 7/10; A62B 7/12; A62B 7/14; A62B 23/00; A62B 23/02; F16L 19/02; F16L 19/0206; F16L 19/0212; F16L 19/0218; F16L 19/0225; F16L 19/0231; F16L 19/0237; F16L 19/0243; F16L 19/025; F16L 19/028; F16L 19/0283; F16L 19/0286; B63C 11/2209; B63C 11/2218; B01D 53/0446; F17C 2270/02; F17C 2270/025; F17C 13/04; F17C 13/045; A61M 16/105
See application file for complete search history.

(56) References Cited

U.S. PATENT DOCUMENTS

| | | |
|---|---|---|
| 2003/0221726 A1 | 12/2003 | Semeia |
| 2005/0001193 A1* | 1/2005 | Droppleman ............. F16K 1/36 251/144 |
| 2012/0006828 A1* | 1/2012 | Frenal .................... F17C 13/04 220/581 |
| 2017/0259895 A1 | 9/2017 | Stradella |

FOREIGN PATENT DOCUMENTS

| | | | |
|---|---|---|---|
| CN | 107037847 A | 8/2017 | |
| CN | 206846011 U | 1/2018 | |
| CN | 109475763 A | 3/2019 | |
| EP | 3194818 A1 | 7/2017 | |
| GB | 0803269 A2 * | 10/1997 | ............... A62B 9/04 |
| RU | 166808 U1 | 12/2016 | |
| WO | 2016041960 A1 | 3/2016 | |

* cited by examiner

HIGH-PRESSURE CONNECTOR FOR A FLUID-COMMUNICATING CONNECTION OF A BREATHING GAS SOURCE OF A RESPIRATOR TO A PRESSURE REDUCER

CROSS REFERENCE TO RELATED APPLICATIONS

This application claims the benefit of priority under 35 U.S.C. § 119 of German Application 10 2018 001 281.7, filed Feb. 19, 2018, the entire contents of which are incorporated herein by reference.

TECHNICAL FIELD

The present invention pertains to a high-pressure connector as a high-pressure connection element (high pressure connector) for a fluid-communicating connection of a breathing gas source (a high pressure gas source) of a respirator to a pressure reducer, to a pressure-reducing device with such a pressure reducer as well as with a corresponding high-pressure connector and to a process for changing a filter device in such a pressure-reducing device.

BACKGROUND

The high-pressure connection element described in the present invention may be termed a fitting connector, a high-pressure fitting connector. The term high pressure as used herein relates e.g., to pressure ranges normally used with $O_2$ high pressure bottles that contain compressed oxygen with a pressure of 200-300 bar. The term high-pressure connector will therefore also be used in the context of the present invention.

It is known that respirators are used to make it possible to ensure the ability to survive or the operation of persons in hazardous areas. Such respirators may be configured as compressed-air respirators or closed-circuit systems. Such closed-circuit systems circulate a breathing gas and are also called closed-circuit respirators. The respirators are equipped with a breathing gas source in both cases. The content of the breathing gas can be adapted to the particular intended purpose. The breathing gas source is usually a compressed air cylinder or a high-pressure breathing gas cylinder, in which the breathing gas is accommodated with a high pressure in a compact form in a corresponding pressure-proof cylinder. To make it possible to guarantee the use of the breathing gas in the respirator, a pressure reducer, via which the high pressure is reduced to a medium pressure and then to a normal ambient pressure for the use of the breathing gas by the user, must be connected to the breathing gas source.

The drawback of the prior-art solutions is that cleaning of the high-pressure connector is necessary and it is relatively complicated. This is due especially to the fact that the breathing gas sources are usually separated from the pressure reducer when stowing and are filled again separately with new breathing gas. There is a risk in this connection that solid particles may enter the port of the breathing gas source in the form of dust, grease or other contaminants. If the breathing gas source is subsequently connected again to the pressure reducer, there is, furthermore, a risk that these penetrated contamination particles reach the pressure reducer or the circuit of the respirator. To avoid this, prior-art high-pressure connectors use suitable filter devices, which prevent the entry of such solid particles or contaminants. It is, however, necessary to change these filter devices at intervals of about one to two years or depending on the intensity of use.

The drawback of the prior-art solutions is that the changing of the filter device must be carried out in a very complicated manner. Thus, the entire high-pressure connector must be detached from the breathing gas source, on the one hand, and from the pressure reducer, on the other hand, in order for the filter device to be subsequently able to be removed from an inner high-pressure duct of the high-pressure connector. This leads to a great effort needed for removal and mounting, on the one hand. Moreover, there is a risk that damage may possibly also develop in the connection between these components in the course of the repeated mounting of the high-pressure connector on the pressure reducer, so that wear is markedly increased here. Last but not least, the desired sealing functionality is often made available between the high-pressure connector and the pressure reducer by means of a plastic deformation. Due to the multiple detachments and reattachments, such a plastic sealing functionality can be reversibly restored only conditionally. Thus, the high-pressure connector will likewise have a high wear after a small number of filter changes and must then accordingly be replaced completely.

SUMMARY

An object of the present invention is to at least partially eliminate the above-described drawbacks. The object of the present invention is, in particular, to make it possible to change the filter device in the high-pressure connector in a cost-effective and simple manner.

A high-pressure connector is provided according to the present invention as a connection device for the fluid-communicating connection of a breathing gas source of a respirator to a pressure reducer. The high-pressure connector has for this purpose a connector upper part with a connector upper part duct with an inlet opening for the inflow of breathing gas from the breathing gas source. Moreover, the high-pressure connector is equipped with a connector lower part with a connector lower part duct with an outlet opening for the outflow of breathing gas into the pressure reducer. The connector upper part has here a fastening interface, which is reversibly fastened to a counter-fastening interface of the connector lower part. The connector upper part duct and the connector lower part duct are thus in a fluid-communicating connection. A filter device is arranged in the connector upper part duct in at least some sections for filtering solid particles out of the breathing gas.

A high-pressure connector (connection device) according to the present invention is based on the prior-art solutions of such high-pressure connectors. The basic idea is that a filter device shall be arranged in the high-pressure connector in this case as well, which is used to filter solid particles out of the breathing gas. However, facilitated removal or replacement and removal of the filter device was now made possible by a multipart configuration on the basis of the prior-art solutions, which disclose a one-part high-pressure connector. The high-pressure connector is divided for this purpose into at least two basic components. These are the connector upper part and the connector lower part. The combination, i.e., when the connector lower part with the counter-fastening interface is reversibly fastened to the fastening interface of the connector upper part, implies again a uniform component of the high-pressure connector, which is composed of the two partial components of the connector upper part and the connector lower part. Concerning the use of the high-pressure connector, i.e., in terms of the operation, especially when this is already mounted on the pressure reducer and a breathing gas source shall now be connected, the high-pressure connector according to the present invention does not differ from the prior-art solutions in any way. Concerning the interfaces, in particular, the interfaces are adapted to the prior-art solutions, so that a high-pressure connector according to the present invention can be used or retrofitted even in case of existing breathing gas sources, in case of existing pressure reducers as well as in case of existing respirators.

The main advantage of a high-pressure connector (connection device) according to the present invention can be recognized when the replacement of the filter device is considered. While the entire high-pressure connector had to be removed from the pressure reducer in the case of the prior-art solutions, the connector lower part remains on the pressure reducer even during the changing of the filter device. It rather suffices to in this case remove the connector upper part from the connector lower part by detaching the fastening interface from the counter-fastening interface. Due to the fact that the filter device is arranged, in at least some sections, in the connector upper part duct, this filter device is removed together with the connector upper part from the connector lower part. The separate handling of the part of the high-pressure connector in which the filter device is arranged makes it possible to pull the filter device out of the connector upper part duct in a simple, cost-effective and reliable manner and rapidly. It should also be noted that the filter device may, of course, also protrude at least partially into the connector lower part duct in the mounted, i.e., fastened position of the connector upper part. However, the filter device is preferably fastened to a duct wall or to another component of the connector upper part, so that the filter device is removed together with the basic body of the connector upper part from the fastened position during the removal of the connector upper part from the connector lower part.

In addition to the facilitated access to the interior of the connector upper part and hence to the filter device, additional advantages are achieved due to the two-part configuration of the high-pressure connector in the manner according to the present invention. In particular, a reversible connectability can be eliminated in case of contacting between the pressure reducer and the connector lower part. A plastic sealing section, as it will be explained later, can thus be used in a simple and cost-effective manner, because this sealing section does not have to be removed from the pressure reducer any more when changing the filter device.

The individual fastenings, especially the fastening interface and the counter-fastening interface, preferably have a gas-tight configuration or correspond to sealants arranged there in order to make it possible to prevent the escape of the breathing gas on the way from the breathing gas source to the pressure reducer.

It may be advantageous if the filter device is arranged completely or essentially completely in the connector upper part duct, especially replaceably, in a high-pressure connector (connection device) according to the present invention. The arrangement is preferably present in a fastened form or, as will be explained later, even in a secured form in order to make it possible to always move the filter device and to remove it from the connector lower part together with the connector upper part. The arrangement completely or essentially completely within the connector upper part duct guarantees an additional amount of protection for the filter device especially during the mounting on the connector lower part. The replaceability may be possible directly or else only after detachment of a securing device or of another geometric or frictionally engaged interlock.

It may be advantageous in a high-pressure connector (connection device) according to the above paragraph if the filter device is secured with a securing device, especially by means of a screw-in securing device, in the connector upper part duct. This also makes it possible to prevent the filter device from falling out when removing the connector upper part. Especially before the reassembly with a new filter device, the latter can be arranged in a secured manner in the connector upper part duct, so that freer and more secure handling of the connector upper part is made possible. An undesired tilting, slipping out or jamming of the filter device during the mounting or during the fastening on the connector lower part is effectively prevented from occurring in this manner. Such a screw-in securing device may have a corresponding handling interface in order to make it possible, for example, to insert a screwdriver as a tool for easier handling.

It is likewise advantageous if the connector lower part in a high-pressure connector (connection device) according to the present invention has a connection interface, especially around the outlet opening, for a fastening connection to the pressure reducer. Such a connection interface may also provide, in particular, a possibility of sealing for a fluid-communicating sealing with the pressure reducer. Such a connection interface is made available especially for inserting the outlet opening or a corresponding connector projection into the pressure reducer. A possibility of fastening with, for example, a thread of the connection interface is also an option in the sense of the present embodiment.

It is likewise advantageous if the connection interface in a high-pressure connector (connection device) according to the present invention has a plastic sealing section for a plastic deformation during fastening at a counter-fastening interface of the pressure reducer. Consequently, if the connection interface is, for example, now screwed into the counter-fastening interface, a sealing section can be plastically deformed. A highly effective sealing bond is thus established by the plastic deformation between the two components of the connector lower part and the pressure reducer. Due to the fact that only the connector upper part is separated from the connector lower part for the replacement of the filter device and the connector lower part thus remains in the sealed position at the pressure reducer, this plastic sealing with this sealing section can be formed irreversibly, and it is not necessary here any longer to take into consideration the possibility of removal and reattachment.

Further, it is advantageous if the connector upper part and/or the connector lower part have a contact section in a high-pressure connector (connection device) according to the present invention for contacting a counter-contact section of a handwheel for the fastening to the breathing gas source. This makes it possible to separate the fastening from the fluid-communicating connection for the high-pressure connector. A handwheel can be pushed over the high-pressure connector and especially over the connector upper part and subsequently screwed, for example, with a screw connection on the breathing gas source. The connector upper part and the connector lower part are thus brought into the fluid-communicating contacting position with the breathing gas source by means of the motion of the handwheel and via the contact section in correlation with the counter-contact section. In a reverse manner, the fluid-communicating connection to the breathing gas source can also be severed by means of the handwheel. In particular, the contact section is rotationally symmetrical, i.e., it is configured, for example, as a circular contact stop.

It may be advantageous if the contact section has a force introduction area on the connector lower part in a high-pressure connector (connection device) according to the above paragraph for passing on a fastening force from the handwheel to an intermediate sealing section between the connector upper part and the connector lower part. This force introduction area makes it possible to guarantee the force path between the handwheel via the counter-contact section and the contact section into the high-pressure connector and there into the connector lower part to the pressure reducer. Due to this embodiment, this force path can be led past the intermediate sealing section, so that sealants arranged there will remain uncompromised by this force path. Moreover, the connector lower part remains with this contact section at the pressure reducer when the connector upper part is being removed, so that it is also guaranteed that the handwheel is secured against loss due to this geometric correlation.

Another advantage can be achieved if the connector upper part and/or the connector lower part in a high-pressure connector (connection device) according to the present invention have at least one handling section for carrying out mounting steps and/or removal steps. This means that it is possible to work with hands or tools on these handling sections for the mounting after the filter change or for the removal prior to the filter change. The handling sections can be used, in particular, for inserting a tool for introducing a sealing mounting force, for example, a sealing mounting torque, in a defined manner.

Moreover, it may be advantageous if the connector upper part and the connector lower part form together an intermediate sealing section for sealing the fluid-communicating connection between the connector upper part duct and the connector lower part duct in a high-pressure connector (connection device) according to the present invention. Such an intermediate sealing section may comprise individual sealing surfaces, which correlate with one another or have additional sealants. In particular, this intermediate sealing section is provided for the reversible separation and formation of a seal between the connector upper part and the connector lower part.

Another subject of the present invention is a pressure-reducing device for the fluid-communicating connection to a breathing gas source of a respirator. Such a pressure-reducing device has a pressure reducer with a high-pressure inlet, which is connected to the outlet opening of a high-pressure connector as a connection device according to the present invention in a fluid-communicating manner. A pressure-reducing device thus implies the same advantages that were explained in detail with reference to a high-pressure connector (connection device) according to the present invention.

A process for changing a filter device in a pressure-reducing device according to the present invention, having the following steps, is also a subject of the present invention:

separation of the fastening interface of the connector upper part from the counter-fastening interface of the connector lower part, removal of the connector upper part from the connector lower part remaining on the pressure reducer, replacement of the filter device in the connector upper part duct, and fastening of the fastening interface of the connector upper part to the counter-fastening interface of the connector lower part to form a fluid-communicating connection between the connector upper part duct and the connector lower part duct.

Due to the removal and reattachment for the possibility of replacing the filter device, a process according to the present invention offers the same advantages as those explained in detail with reference to a pressure-reducing device according to the present invention as well as with reference to a high-pressure connector (connection device) according to the present invention.

Further advantages, features and details of the present invention appear from the following description, in which exemplary embodiments of the present invention are specifically described with reference to the drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF PREFERRED EMBODIMENTS

Figure 1:
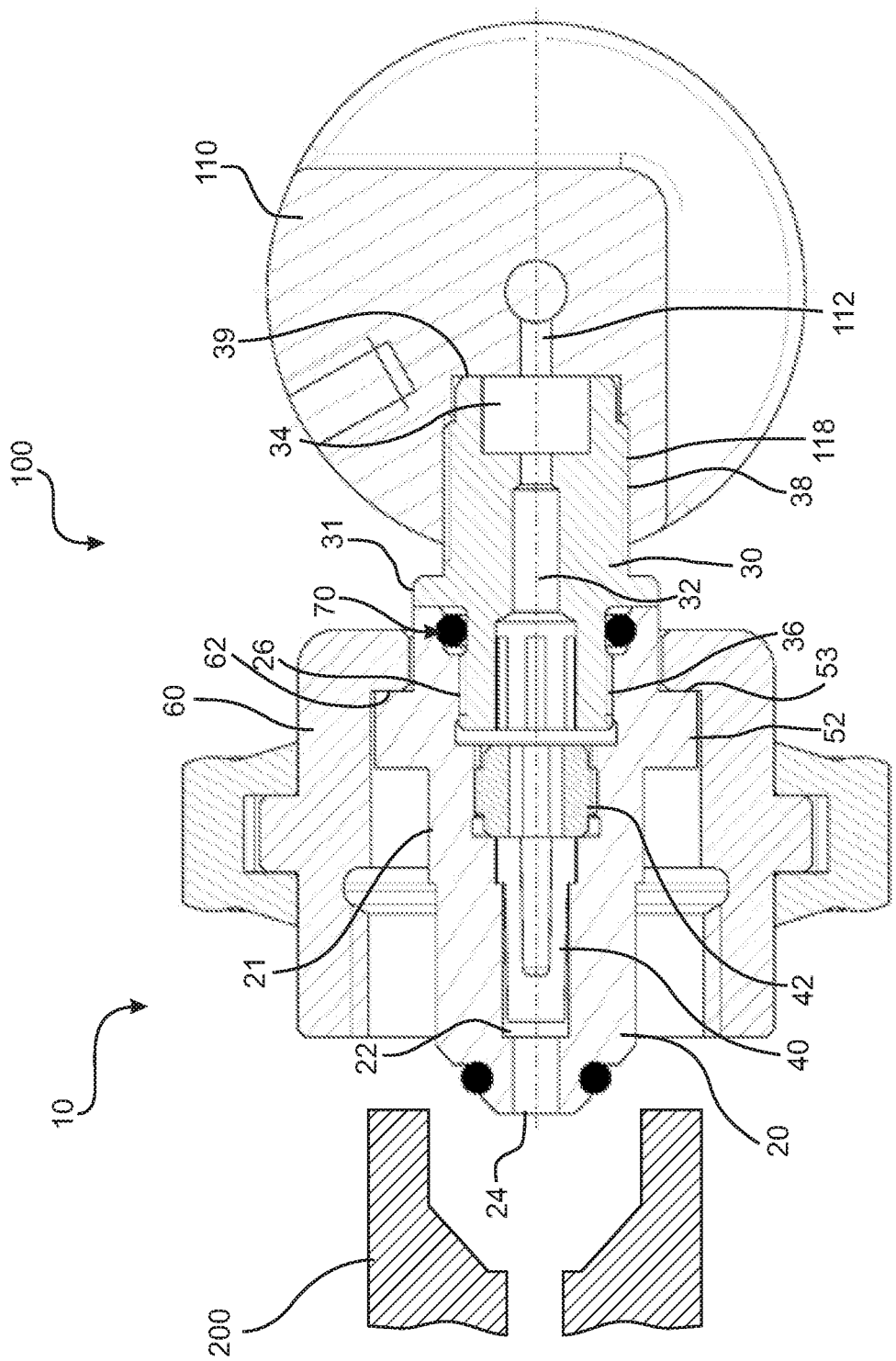
FIG. 1 is a sectional view showing a first embodiment of a pressure-reducing device according to the present invention.

Referring to the drawings, FIG. 1 schematically shows the cross section of a first embodiment of a pressure-reducing device 100. A high-pressure connector 10 is provided in this case as a connection device to make breathing gas available for a closed circuit or a breathing cycle of a respirator from a breathing gas source 200 shown schematically, for example, in the form a compressed-air cylinder, via a pressure reducer 110. The high-pressure connector 10 comprises a connector upper (first connection side) part 20 with a connector upper part duct 22 an inlet opening 24 for the inflow of breathing gas from the breathing gas source 200. The high-pressure connector 10 further comprises a connector lower (second connection side) part 30 with a connector lower part duct 32 with an outlet opening 34 for the outflow of breathing gas into the pressure reducer 110. The connector upper part 20 has a fastening interface 26 comprised of an inner surface of a cylindrical bore portion, which is reversibly fastened to a counter-fastening interface 36 comprised of a complementary threaded outer surface of a cylindrical portion of the connector lower part 30. The connector upper part duct 22 and the connector lower part duct 32 are joined to provide a fluid-communicating connection. A filter device 40 is arranged in the connector upper part duct 22, in at least some sections of the connector upper part duct 22, for filtering solid particles out of the breathing gas passing through the high-pressure connector 10. The high-pressure connector 10 may be fastened to the breathing gas source 200 by means of a handwheel 60. As soon as this fastening is complete, the inlet opening 24 comes into fluid-communicating connection with the breathing gas source 200, so that the breathing gas can flow into the connector upper part duct 22 of the connector upper part 20.

The filter device 40 is secured by means of a securing device 42, such that the filter device 40 is located within the connector upper part 20. The securing device 42 may be in the form of a screw-in securing device, having a corresponding handling interface in order to make it possible, for example, to insert a screwdriver as a tool for easier handling. The filter device 40 makes it possible to retain contaminants and solid particles from the breathing gas flowing in and thus to filter them out of the breathing gas for the further course. The fluid stream proceeds into the connector lower part duct 32 of the connector lower part 30 and can enter from there the high-pressure inlet 112 of the pressure reducer 110 via the outlet opening 34.

To replace the filter device 40, the connection to the breathing gas source 200 is severed by means of the handwheel 60 and the corresponding bracing via the counter-contact section 62. As soon as this connection is free, the connector upper part 20 can be screwed out of the fastening position by means of a tool on the handling section 21, so that the fastening interface 26 separates from the counter-fastening interface 36. The filter device 40 can be replaced by detaching the securing device 42 from the inner side, which now becomes free, and the reattachment can subsequently be carried out in the reverse manner.

During the first mounting, i.e., when the high-pressure connector 10 is fastened to the pressure reducer 110, the connector lower part 30 may also be connected to the pressure reducer 110 in a fluid-communicating manner via another handling section 31. A plastic deformation of the sealing section 39 takes place due, for example, to a thread formation between a connection interface 38 and the counter-connection interface 118. This sealing section 39 is not detached during the filter change of the filter device 40. To ensure that the fluid-communicating connection is secured against the escape of gas between the connector upper part 20 and the connector lower part 30, an intermediate sealing section 70 is provided comprising an additional sealant.

Figure 2:
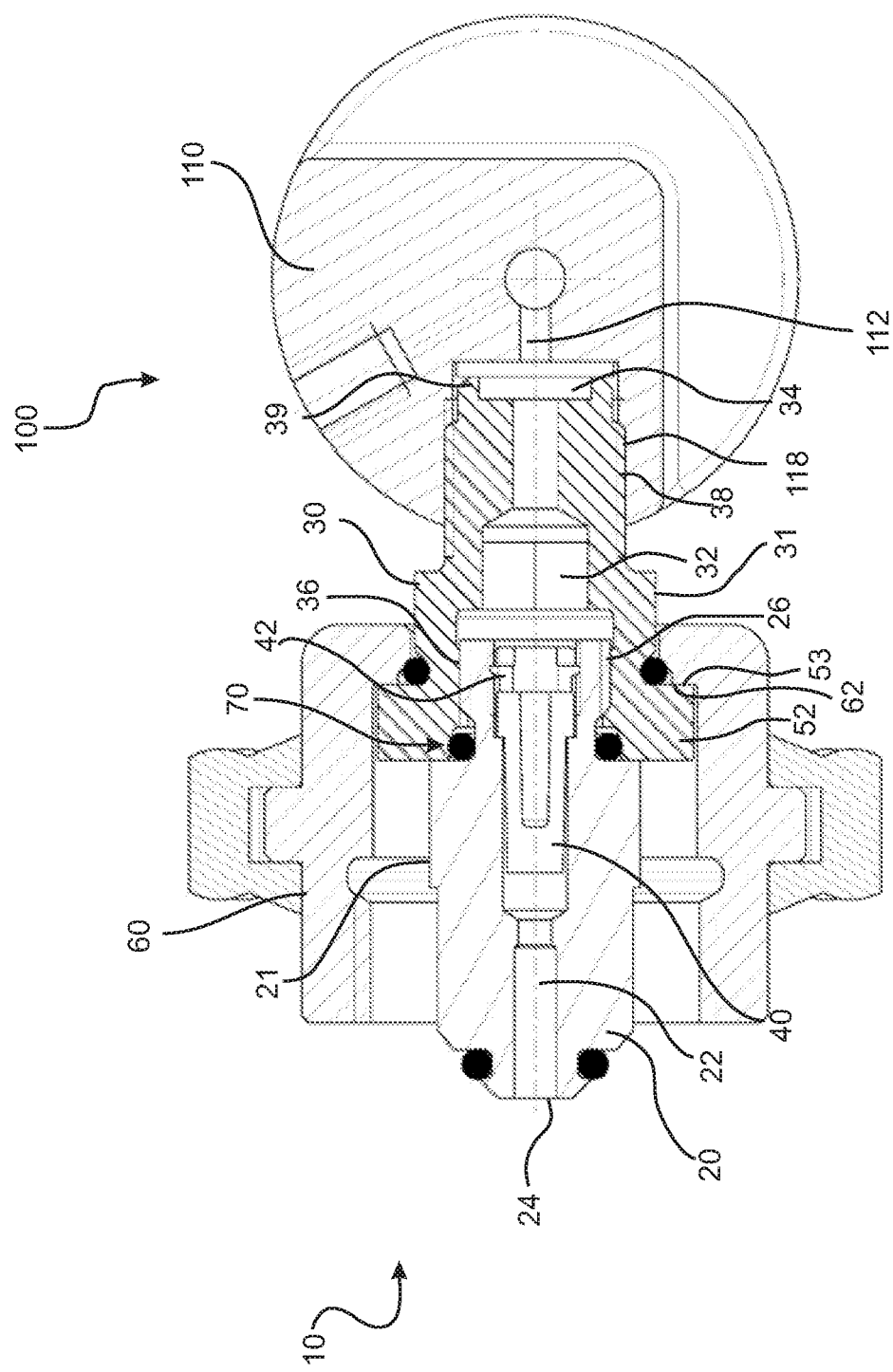
FIG. 2 is a sectional view showing another embodiment of a pressure-reducing device according to the present invention.

FIG. 2 shows another embodiment of the high-pressure connector 10 as a connection device, which embodiment is essentially identical to the embodiment according to FIG. 1 in terms of configuration and function. However, a different arrangement of the handwheel 60 with the counter-contact section 62 to the contact section 52 is provided with this embodiment. Thus, the contact section 52 may be arranged on the connector lower part 30 in FIG. 2 and on the connector upper part 20 in FIG. 1. As soon as the positive-locking connection with the breathing gas source 20 is provided by means of the handwheel 60, the corresponding force path is braced over the counter-contact section 62 and the contact section 52 in FIG. 2 with the connector lower part 30. This bracing force can be directly introduced into the connector lower part 30 via the force introduction area 53, so that an undesired force or force effect of the intermediate sealing section 70 fails to materialize or is reduced to a minimum.

The above explanation of the embodiments describes the present invention exclusively within the framework of examples. Individual features of the embodiments, insofar as technically meaningful, may, of course, be combined freely with one another without going beyond the scope of the present invention.

While specific embodiments of the invention have been shown and described in detail to illustrate the application of the principles of the invention, it will be understood that the invention may be embodied otherwise without departing from such principles.

APPENDIX

List of Reference Designation

10 High-pressure connector (high-pressure connection device, connection device)
20 Connector upper part (upper part of the connection device 10)
21 Handling section
22 Connector upper part duct (duct in upper part 20 of the connection device 10)
24 Inlet opening
26 Fastening interface
30 Connector lower part (lower part of the connection device 10)
31 Handling section
32 Connector lower part duct (duct in the lower part 30 of the connection device 10)
34 Outlet opening
36 Counter-fastening interface
38 Connection interface
39 Sealing section
40 Filter device
42 Securing device
52 Contact section
53 Force introduction area
60 Handwheel
62 Counter-contact section
70 Intermediate sealing section
100 Pressure-reducing device
110 Pressure reducer
112 High-pressure inlet
118 Counter-connection interface
200 Breathing gas source, compressed gas cylinder, compressed oxygen cylinder

What is claimed is:

1. A high-pressure connector for a fluid-communicating connection of a breathing gas source of a respirator to a pressure reducer, the high-pressure connector comprising:
   a connector upper part comprising a connector upper part duct with an inlet opening for an inflow of breathing gas from the breathing gas source, wherein the connector upper part further comprises a breathing gas source connection interface around the inlet opening and a fastening interface;
   a connector lower part comprising a connector lower part duct with an outlet opening for an outflow of breathing gas into the pressure reducer, wherein the connector lower part further comprises a connection interface around the outlet opening for a fastening connection of the high-pressure connector to the pressure reducer and a counter-fastening interface, wherein the connector upper part is fastened reversibly with the fastening interface at the counter-fastening interface of the connector lower part in a fastened state of the connector upper part and the connector lower part and the connector upper part duct is in fluid-communicating connection with the connector lower part duct in the fastened state of the connector upper part and the connector lower part; and
   a filter device arranged in the connector upper part duct for filtering solid particles out of the breathing gas wherein the filter device comprises a securing device and the filter device is secured in the connector upper part duct with the securing device and the filter device is configured to be replaceably arranged completely or essentially completely in the connector upper part duct, wherein in the fastened state of the connector upper part and the connector lower part, with the connector upper part fastened via the fastening interface at the counter-fastening interface of the connector lower part, the filter device is maintained secured in the connector upper part duct; and wherein in an unfastened state of the connector upper part and the connector lower part, with the connector upper part unfastened from the fastening interface at the counter-fastening interface of the connector lower part, the filter device is maintained secured in the connector upper part duct, and the filter device is configured to be unsecured from the connector upper part duct, in the unfastened state of the connector upper part and the connector lower part, allowing a replacement of the filter device with a replacement filter device.

2. A high-pressure connector in accordance with claim 1, wherein the the securing device comprises a screw-in securing device and the filter is secured in the connector upper part duct with the screw-in securing device.

3. A high-pressure connector in accordance with claim 1, wherein the connection interface comprises a plastic sealing section configured to plastically deform during fastening at a counter-connection interface of the pressure reducer.

4. A high-pressure connector in accordance with claim 3, wherein in the unfastened state of the connector upper part and the connector lower part, with the connection interface of the connector lower part plastically deformed and fastened at a counter-connection interface of the pressure reducer, the high-pressure inlet of the pressure reducer is maintained fluid-communicatingly connected with the outlet opening of the high-pressure connector.

5. A high-pressure connector in accordance with claim 1, wherein the connector upper part or the connector lower part or both the connector upper part and the connector lower part comprise a contact section configured to contact a counter-contact section of a handwheel for fastening to a breathing gas source.

6. A high-pressure connector in accordance with claim 5, wherein the contact section comprises a force introduction area on the connector lower part for transmitting a fastening force from the handwheel, at an intermediate sealing section between the connector upper part and the connector lower part.

7. A high-pressure connector in accordance with claim 1, wherein the connector upper part or the connector lower part or both the connector upper part and the connector lower part comprise at least one handling section for carrying out mounting steps or carrying out removal steps or for carrying out mounting steps and carrying out removal steps.

8. A high-pressure connector in accordance with claim 1, wherein the connector upper part and the connector lower part together form an intermediate sealing section for sealing the fluid-communicating connection between the connector upper part duct and the connector lower part duct.

9. A pressure-reducing device for a fluid-communicating connection to a breathing gas source of a respirator, the pressure-reducing device comprising:

a pressure reducer with a high-pressure inlet;

a high-pressure connector comprising a connector upper part comprising a connector upper part duct with an inlet opening for an inflow of breathing gas from the breathing gas source, wherein the connector upper part further comprises a breathing gas source interface around the inlet opening and a fastening interface, a connector lower part comprising a connector lower part duct with an outlet opening for an outflow of breathing gas into the pressure reducer, wherein the connector lower part further comprises a connection interface around the outlet opening for a fastening connection of the high-pressure connector to the pressure reducer and a counter-fastening interface, wherein the connector upper part is fastened reversibly with the fastening interface at the counter-fastening interface of the connector lower part in a fastened state of the connector upper part and the connector lower part and the connector upper part duct is in fluid-communicating connection with the connector lower part duct in the fastened state of the connector upper part and the connector lower part, and a filter device arranged in the connector upper part duct for filtering solid particles out of the breathing gas, wherein the filter device comprises a securing device and the filter device is secured in the connector upper part duct with the securing device and the filter device is configured to be replaceably arranged completely or essentially completely in the connector upper part duct, wherein the high-pressure inlet of the pressure reducer is fluid-communicatingly connected with the outlet opening of the high-pressure connector in the fastened state of the connector upper part and the connector lower part, wherein in the fastened state of the connector upper part and the connector lower part, with the connector upper part fastened via the fastening interface at the counter-fastening interface of the connector lower part, the filter device is maintained secured in the connector upper part duct; and wherein in an unfastened state of the connector upper part and the connector lower part, with the connector upper part unfastened from the fastening interface at the counter-fastening interface of the connector lower part, the filter device is maintained secured in the connector upper part duct, and the filter device is configured to be unsecured from the connector upper part duct, in the unfastened state of the connector upper part and the connector lower part, allowing a replacement of the filter device with a replacement filter device.

10. A pressure-reducing device in accordance with claim 9, wherein the securing device comprises a screw-in securing device and the filter device is secured in the connector upper part duct with the screw-in securing device.

11. A pressure-reducing device in accordance with claim 9, wherein the connection interface comprises a plastic sealing section configured to plastically deform during fastening at a counter-connection interface of the pressure reducer.

12. A pressure-reducing device in accordance with claim 11, wherein in the unfastened state of the connector upper part and the connector lower part, with the connection interface of the connector lower part plastically deformed and fastened at a counter-connection interface of the pressure reducer, the high-pressure inlet of the pressure reducer is maintained fluid-communicatingly connected with the outlet opening of the high-pressure connector.

13. A pressure-reducing device in accordance with claim 9, wherein the connector upper part or the connector lower part or both the connector upper part and the connector lower part comprise a contact section configured to contact a counter-contact section of a handwheel for fastening to a breathing gas source.

14. A pressure-reducing device in accordance with claim 13, wherein the contact section comprises a force introduction area on the connector lower part for transmitting a fastening force from the handwheel, at an intermediate sealing section between the connector upper part and the connector lower part.

15. A pressure-reducing device in accordance with claim 9, wherein the connector upper part or the connector lower part or both the connector upper part and the connector lower part comprise at least one handling section for carrying out mounting steps or carrying out removal steps or for carrying out mounting steps and carrying out removal steps.

16. A pressure-reducing device in accordance with claim 9, wherein the connector upper part and the connector lower part together form an intermediate sealing section for sealing the fluid-communicating connection between the connector upper part duct and the connector lower part duct.

17. A process for a fluid-communicating connection of a breathing gas source of a respirator to a pressure reducer, the process comprising the steps of:
  providing a pressure-reducing device, wherein the pressure-reducing device comprises the pressure reducer with a high-pressure inlet, and a high-pressure connector comprising a connector upper part comprising a connector upper part duct with an inlet opening for an inflow of breathing gas from the breathing gas source, wherein the connector upper part further comprises a breathing gas source interface around the inlet opening and a fastening interface, a connector lower part comprising a connector lower part duct with an outlet opening for an outflow of breathing gas into the pressure reducer, wherein the connector lower part further comprises a connection interface around the outlet opening for a fastening connection of the high-pressure connector to the pressure reducer and a counter-fastening interface, wherein the connector upper part is fastened reversibly with the fastening interface at the counter-fastening interface of the connector lower part in a fastened state of the connector upper part and the connector lower part and the connector upper part duct is in fluid-communicating connection with the connector lower part duct in the fastened state of the connector upper part and the connector lower part, and a filter device arranged in the connector upper part duct for filtering solid particles out of the breathing gas, wherein the filter device comprises a securing device and the filter device is secured in the connector upper part duct with the securing device and the filter device is configured to be replaceably arranged completely or essentially completely in the connector upper part duct, wherein the high-pressure inlet of the pressure reducer is fluid-communicatingly connected with the outlet opening of the high-pressure connector in the fastened state of the connector upper part and the connector lower part,
  wherein in the fastened state of the connector upper part and the connector lower part, with the connector upper part fastened via the fastening interface at the counter-fastening interface of the connector lower part, the filter device is maintained secured in the connector upper part duct; and
  wherein in an unfastened state of the connector upper part and the connector lower part, with the connector upper part unfastened from the fastening interface at the counter-fastening interface of the connector lower part, the filter device is maintained secured in the connector upper part duct, and the filter device is configured to be unsecured from the connector upper part duct, in the unfastened state of the connector upper part and the connector lower part, allowing a replacement of the filter device;
  providing a replacement filter device comprising a securing device; and
  changing the filter device in the pressure-reducing device, wherein changing the filter device comprises:
    separating the fastening interface of the connector upper part from the counter-fastening interface of the connector lower part to provide the unfastened state of the connector upper part and the connector lower part;
    removing the connector upper part from the connector lower part, with the connector lower part remaining on the pressure reducer and with the filter device being carried by the connector upper part, based on the filter device being secured to the connector upper part;
    disconnecting the filter from the connector upper part by unsecuring the filter from the connector upper part;
    replacing the filter device in the connector upper part duct with the replacement filter device, including securing the replacement filter device to the connector upper part; and
    fastening of the fastening interface of the connector upper part to the counter-fastening interface of the connector lower part for forming a fluid-communicating connection between the connector upper part duct and the connector lower part duct.

* * * * *